United States Patent [19]
Talu

[11] Patent Number: 5,247,971
[45] Date of Patent: Sep. 28, 1993

[54] GAS STORAGE PROCESS

[75] Inventor: Orhan Talu, Richmond Hts., Ohio

[73] Assignee: Cleveland State University, Cleveland, Ohio

[21] Appl. No.: 856,357

[22] Filed: Mar. 23, 1992

[51] Int. Cl.[5] ............................................. B65B 31/00
[52] U.S. Cl. ........................................... 141/9; 141/2; 141/4; 141/100
[58] Field of Search ....................... 141/2-4, 141/9, 18, 37, 100, 102, 104, 105; 48/190; 222/3; 123/1 A, 525-528; 206/0.6, 0.7; 220/581

[56] References Cited

U.S. PATENT DOCUMENTS

| | | | |
|---|---|---|---|
| 1,608,155 | 11/1926 | Barnebey | 222/3 |
| 2,431,676 | 12/1947 | Bour | 206/0.7 |
| 4,817,684 | 4/1989 | Turko et al. | 141/4 |

Primary Examiner—Henry J. Recla
Assistant Examiner—Casey Jacyna
Attorney, Agent, or Firm—John F. McDevitt

[57] ABSTRACT

An improved method for storage of a first adsorbable gas is disclosed employing a more strongly adsorbed gaseous material. The first adsorbable gas is stored in a bed of solid adsorbent particles after already having adsorbed the more strongly adsorbable gas which causes less of the first adsorbable gas to be retained when being desorbed from the storage medium.

14 Claims, 1 Drawing Sheet

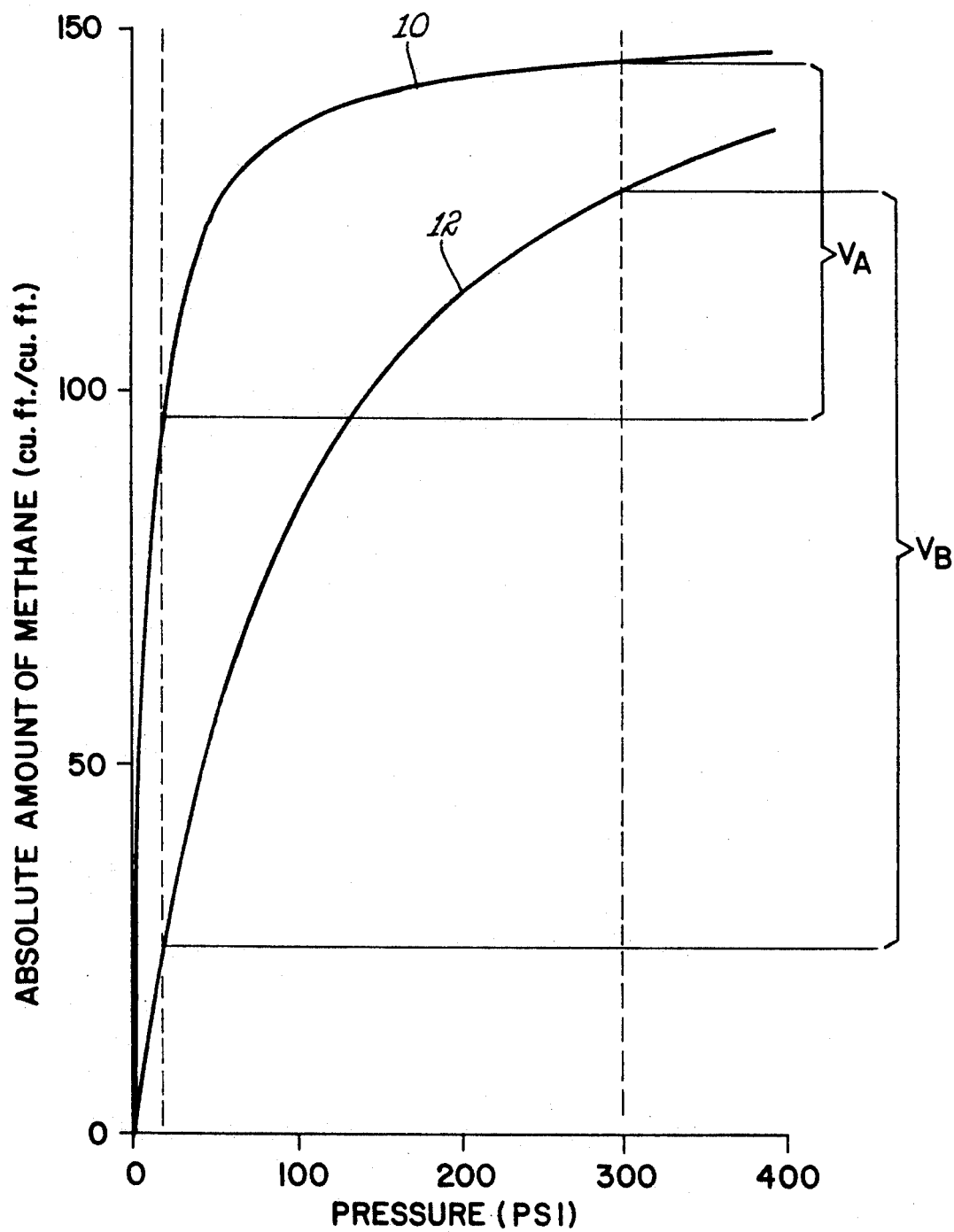

5,247,971

1

GAS STORAGE PROCESS

BACKGROUND OF THE INVENTION

This invention relates generally to a method improving storage capacity for an adsorbable gas and, more particularly, to effecting such storage in a composite adsorption medium wherein a bed of solid adsorbent particles has already adsorbed therein a more strongly adsorbent gas.

Adsorptive storage of gases is more efficient than compression storage due to the reduced pressure levels. At low pressures, the container cylinders need not be heavy-wall and the compressor can be a single-stage rather than multi-stage compressor reducing the fixed costs. In addition, operating costs of the compressors are greatly reduced because of the lower discharge pressures employed to desorb the adsorbed gas. Adsorptive storage can be utilized for any gas which has a critical temperature higher than ambient temperature, which, therefore, cannot be liquefied without refrigeration. At present there is only commercial application for adsorptive storage of natural gas. The desired storage can be effected by contacting the gas stream with a bed of solid adsorbent particles employing fixed or static bed operation as well as moving bed operation. Of major consideration in developing and optimizing adsorptive storage systems is the storage efficiency of the gas. Volumetric storage capacity is a recognized criteria for storage efficiency which can be defined as the number of bed volumes discharged at atmospheric conditions per storage bed volume. As such, the volume storage capacity represents a ratio of two volumes, for example, cubic feet per cubic feet.

A low-pressure system for storing gaseous hydrocarbon fuel in automotive vehicles is disclosed in U.S. Pat. No. 4,523,548. Multiple cylinders are employed containing either adsorbent or absorbent material including molecular sieves, activated carbon, zeolite compounds, various clays and silica gel which store the hydrocarbon gas at pressures ranging from approximately 100 psig to approximately 400 psig. The gas is filtered before storage with sorptive filtering means to remove undesirable constituents such as odorant additives (dimethyl sulfide and the like) which are frequently included in natural gas as a safety measure. The reported purpose (column 14, lines 19-22) for removing such constituents is further said to be maximizing the capability of the storage vessels to sorptively store the lighter hydrocarbons such as methane. A different storage system for gaseous hydrocarbon fuels is disclosed in U.S. Pat. No. 4,817,684. An illustrated gas mixture of methane containing an additive such as dimethyl sulfide, tetrahydrothiothene (THT), tertiary butyl mercaptan (TBM) and others is adsorbed at elevated pressures within a storage vessel containing a bed of solid adsorbent particles which has been preconditioned at a lower pressure with the additive. Storage of the gas mixture within the storage vessel is said to proceed in accordance with isothermic curves depicted in FIG. 2 of said prior art reference (column 5, lines 26-32).

In all such type adsorptive storage systems, a considerable amount of the adsorbable gas can also be left on the solid adsorption medium (contained in the cylinder or other type storage vessel) after the depletion pressure is reached. As high as fifty percent of the adsorbed gas contained in the storage vessel at charge can be retained in the adsorption bed at depletion depending on the particular adsorbable gas and solid adsorption medium being employed. The adsorbed gas left after depletion is not usable in any normal storage application since it will require vacuum application to remove it. Accordingly, there still remains a serious need for better means to desorb more of the stored gas at atmospheric conditions of pressure and temperature.

It is therefore an object of the present invention to provide a more effective method of storing an adsorbable gas in a solid adsorption medium so that less gas is retained upon removal therefrom.

It is another object of the present invention to provide a method which increases the storage capacity of an adsorptive storage system by removing more of the adsorbed gas.

It is still a further object of the present invention to provide a method of storing an adsorbable gas at elevated pressures in a bed of solid adsorbent particles so that more of the adsorbed gas is released when pressure is reduced.

These and other objects as well as advantages of the present invention will become more apparent from the following detailed description being provided upon the preferred embodiments.

SUMMARY OF THE INVENTION

It has now been discovered, surprisingly, that storage of a first adsorbable gas at elevated pressures in a bed of solid adsorbent particles such as activated carbon or zeolite compounds which have been preconditioned by prior adsorption of a second more strongly adsorbed gas causes more of the first adsorbable gas to be desorbed when pressure is reduced. Accordingly, the storage capacity of conventional adsorption apparatus being operated in such manner will be greater since storage capacity is proportional to the difference between whatever amount of the first adsorbable gas is adsorbed and the amount still remaining adsorbed at the reduced pressure. Prior addition of the second adsorbable gas in the storage system has been found to decrease the amount of first adsorbable gas thereafter when introduced at the selected elevated pressure while also decreasing the amount remaining adsorbed when pressure is subsequently reduced. So long as the decrease in adsorption of the first adsorbable gas remains greater at reduced pressure than the amount of its decrease at the more elevated pressure of introduction, the net effect is an increase in storage capacity. Desirable modification in the adsorption behavior of the first adsorbable gas by such means has also not been found limited to specific adsorbent-gas pairs. Thus, capacity enhancement occurs for all adsorptive storage systems with the degree of enhancement depending upon the particular materials utilized.

Basically, the presently improved method for increasing the storage capacity of said first adsorbable gas is conducted in a storage vessel containing the bed of adsorbent particles and comprises the steps of: (a) admitting a second more strongly adsorbed gas to the storage vessel causing a substantial portion of the admitted gas to become adsorbed in the adsorbent bed, (b) subsequently admitting the first adsorbable gas to the storage vessel at superatmospheric pressure causing a substantial portion of the admitted gas to also become adsorbed in the adsorbent bed while further increasing pressure within the storage vessel, and (c) releasing the adsorbed gases from the storage vessel by reducing pressure within the storage vessel whereupon the amount of first adsorbable gas being released remains greater at all reduced pressures than does occur if said first adsorbable gas is stored alone and released under the same pressure conditions. The presently improved process can further be conducted at varying temperature and pressure conditions found optimum for adsorption and release of the particular gaseous substance being stored to include such adsorption being carried out at ambient temperature as well as elevated temperatures. Correspondingly, the presently improved method can be carried out in existing adsorption equipment means to include multiple beds of the adsorbent particles being operated together for both storage and removal. In a preferred embodiment, a gaseous hydrocarbon fuel such as natural gas is stored in an adsorption chamber containing a bed of activated carbon particles by means of (a) first admitting a gaseous larger molecular weight organic compound containing sulfur such as dimethyl sulfide to the storage vessel causing a substantial portion of the admitted gas to be adsorbed in the adsorbent bed, (b) subsequently admitting the natural gas to the storage vessel at a superatmospheric pressure causing a substantial portion of the admitted natural gas to also become adsorbed in the adsorbent bed while further increasing pressure within the storage vessel, and (c) releasing the adsorbed gases from the storage vessel at substantially ambient temperature by reducing pressure within the storage vessel to approximately atmospheric pressure whereupon the amount of natural gas being released remains greater at all reduced pressures than does occur if said gaseous hydrocarbon fuel is stored alone and released under the same conditions.

BRIEF DESCRIPTION OF THE DRAWING

The accompanying drawing is a graph depicting the enhanced storage capacity achieved with operation of a conventional adsorption apparatus in accordance with the present method.

DETAILED DESCRIPTION OF THE PREFERRED EMBODIMENTS

To still more specifically illustrate the present method in connection with the aforementioned preferred embodiment, dimethyl sulfide was selected as a more strongly adsorbed gas in the adsorption of methane with a bed of the activated carbon absorbent. Selecting dimethyl sulfide for the preconditioning agent was based upon its being a lighter molecular weight organic compound than other useful additives which should thereby have less impact upon subsequent methane adsorption. Accordingly, various evaluations were conducted to determine the effect of suppressing methane adsorption with said preconditioning agent under the particular charge pressures and depletion pressures being studied. The accompanying graph depicts typical adsorption behavior at the illustrated pressure conditions when methane is stored in a conventional adsorption chamber having the illustrated solid adsorbent as compared with methane storage after having first adsorbed the dimethyl sulfide additive. Curve 10 represents methane adsorption behavior without any additive being employed to demonstrate the difference between amounts adsorbed at various superatmospheric charge pressures and amounts remaining adsorbed when released at lower pressures. As can be seen from the depicted adsorption behavior, a difference "$V_A$" in storage capacity results upon releasing the stored methane at atmospheric pressure. Remaining curve 12 demonstrates methane adsorption behavior in accordance with the present invention at the same charge pressure and depletion pressure conditions. As distinct from storage characteristics reported in both aforementioned prior art references, it can first be noted that methane adsorption is found suppressed in the presence of an adsorbed additive. The difference "$V_B$" shown in curve 12 represents methane storage capacity with the illustrated additive which is much higher than without additive because the methane amount adsorbed is suppressed more at the lower release pressure. It follows from these results that when methane adsorption is suppressed more at depletion than charge conditions that an increase in storage capacity results. It likewise follows from the relative amounts of methane shown to be still adsorbed at atmospheric pressure by the respective curves that far less methane is being retained in storage according to the present invention.

Still further useful results were found in conducting the above illustrated process. The amount of dimethyl sulfide added to the carbon adsorbent was found to influence methane storage capacity. Specifically, methane storage capacity increased with increasing odorant adsorption up to a maximum then decreased at higher loading levels. Maximum methane storage capacity also occurred at different additive levels dependent upon the temperatures employed. It can be appreciated, therefore, in optimizing storage enhancement according to the present invention that both temperature and preconditioning agent levels can influence the degree of enhancement realized. To still further illustrate these effects in connection with the conducted evaluation, larger amounts of the adsorbed additive were found to suppress the heat of adsorption of methane and thereby produce smaller temperature changes both during the charge and depletion cycles. Such methane storage capacity increases with an increase in the temperature at which depletion takes place, hence temperature reductions prove undesirable. On the other hand, higher loadings of this additive are found to increase its concentration in the gas mixture upon being released at a lower pressure and with such relative proportion increasing with a decrease in the pressure at which the gases are released.

It will be apparent from the foregoing description that a broadly useful and novel method has been provided to improve the storage capacity in adsorptive storage systems. It will also be apparent that significant further modifications can be made in the particular gas substance being stored, the accompanying gaseous preconditioning agent being employed, and the solid adsorbent selected to do so other than herein specifically illustrated, however, without departing from the true spirit and scope of the present invention. Likewise, modifications other than specifically herein disclosed can be employed to vary the operating conditions when conducting the disclosed method to include both pressure and temperature variations. Consequently, it is intended to limit the present invention only by the scope of the appended claims.

What I claim as new and desire to secure by Letters Patent of the United States is:

1. A method to increase the storage capacity of a first adsorbable gas in a storage vessel containing a bed of adsorbent particles comprising the steps of:
   (a) admitting a second more strongly adsorbed gas to the storage vessel causing a substantial portion of the admitted gas up to a predetermined maximum level to become absorbed in the adsorbent bed, (b) subsequently admitting the first adsorbable gas alone to the storage vessel at superatmospheric pressure to cause a substantial portion of the admitted gas to also become adsorbed in the adsorbent bed while further increasing pressure within the storage vessel, and (c) releasing the adsorbed gases from the storage vessel by reducing pressure within the storage vessel whereupon the amount of first adsorbable gas being released remains greater at all reduced pressures than does occur if said first adsorbable gas is stored alone and released under the same pressure conditions.

2. The method of claim 1 wherein the pressure within the storage vessel is reduced approximately to atmospheric pressure.

3. The method of claim 1 wherein release of the adsorbed gases is carried out at substantially ambient temperature.

4. The method of claim 1 wherein the storage capacity of the first adsorbable gas increases with the amount of second adsorbable gas adsorbed in the adsorbent bed.

5. The method of claim 1 wherein the storage capacity of the first adsorbable gas increases to a maximum value then decreases.

6. The method of claim 1 wherein the storage capacity of the first adsorbable gas decreases with an increase in temperature at which the gases are released.

7. The method of claim 1 wherein the relative proportion of the second adsorbable gas in the gases being released increases with a decrease in the pressure at which the gases are released.

8. The method of claim 1 wherein the storage vessel employs a static bed of the adsorbent particles.

9. The method of claim 1 wherein the storage vessel employs a moving bed of the adsorbent particles.

10. A method to increase the storage capacity of a gaseous hydrocarbon fuel in a storage vessel containing a bed of adsorbent particles comprising the steps of:

(a) admitting a gaseous larger molecular weight organic compound to the storage vessel causing a substantial portion of the admitted gas up to a predetermined maximum level to be adsorbed in the adsorbent bed, (b) subsequently admitting the gaseous hydrocarbon fuel alone to the storage vessel at a superatmospheric pressure to cause a substantial portion of the admitted hydrocarbon fuel to also become adsorbed in the adsorbent bed while further increasing pressure within the storage vessel, and (c) releasing the adsorbed gases from the storage vessel at substantially ambient temperature by reducing pressure within the storage vessel to approximately atmospheric pressure whereupon the amount of gaseous hydrocarbon fuel being released remains greater at all reduced pressures than does occur if said gaseous hydrocarbon fuel is stored alone and released under the same conditions.

11. The method of claim 10 wherein the gaseous hydrocarbon fuel is methane.

12. The method of claim 10 wherein the larger molecular weight organic compound contains sulfur.

13. The method of claim 10 wherein the adsorbent particles comprise activated carbon.

14. The method of claim 10 wherein the adsorbent particles comprise a zeolite compound.

* * * * *